July 24, 1956  H. A. TOULMIN, JR  2,755,719
ROTARY PLOW
Original Filed Sept. 3, 1953  3 Sheets-Sheet 1
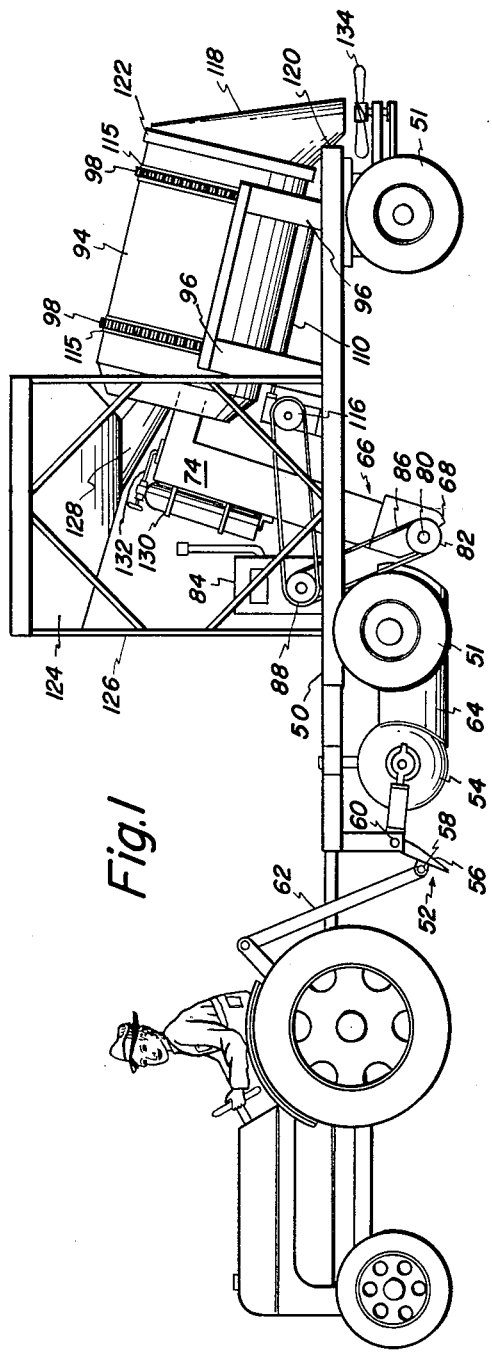
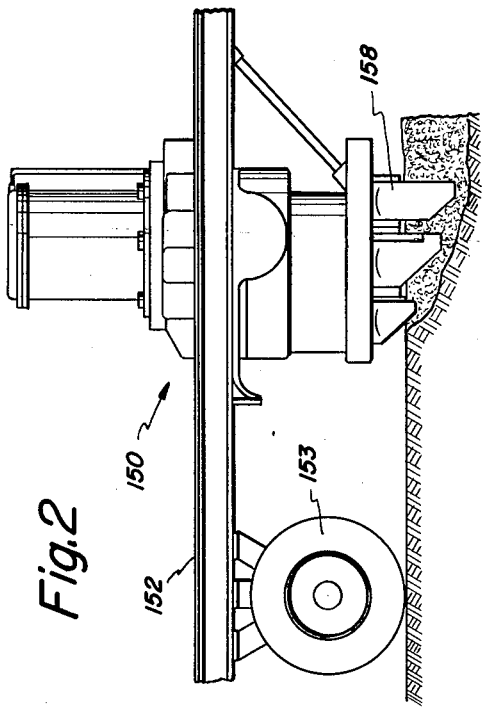
INVENTOR.
HARRY A. TOULMIN, Jr.
BY
Toulmin & Toulmin
Attorneys

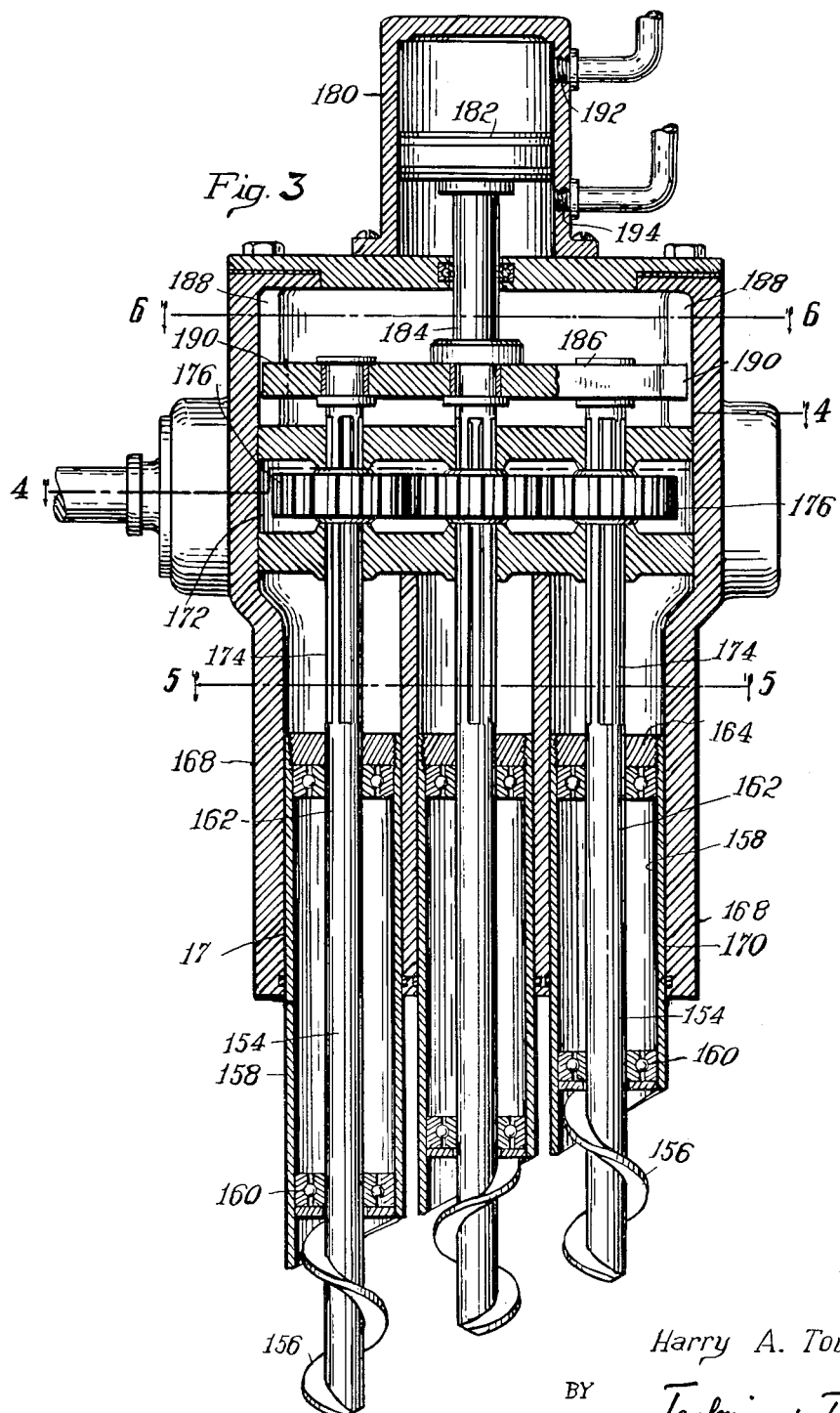

July 24, 1956
H. A. TOULMIN, JR
2,755,719
ROTARY PLOW
Original Filed Sept. 3, 1953
3 Sheets-Sheet 3
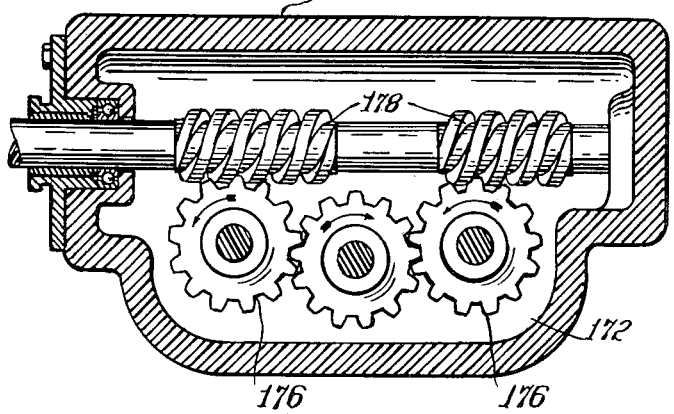
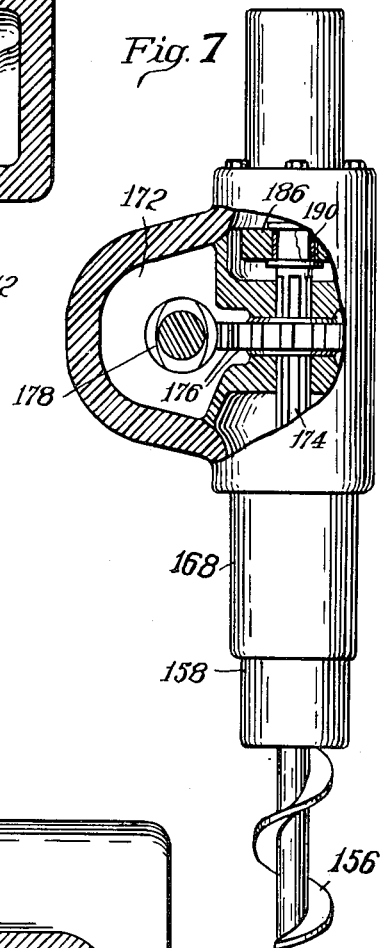
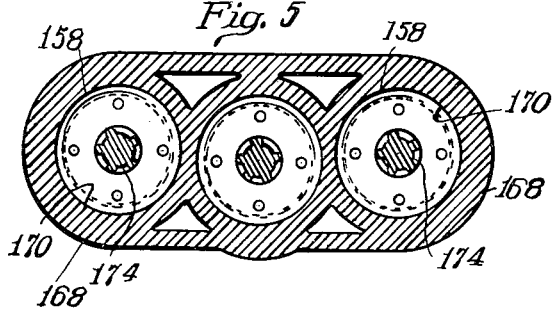
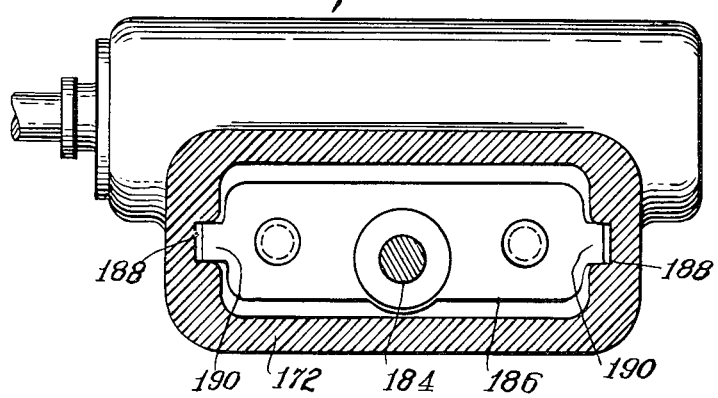
INVENTOR
Harry A. Toulmin Jr.
BY *Toulmin & Toulmin*
ATTORNEYS United States Patent Office 2,755,719
Patented July 24, 1956

2,755,719

ROTARY PLOW

Harry A. Toulmin, Jr., Dayton, Ohio, assignor to The Commonwealth Engineering Company of Ohio, Dayton, Ohio, a corporation of Ohio Original application September 3, 1953, Serial No. 378,276. Divided and this application July 6, 1954, Serial No. 441,289

5 Claims. (Cl. 97—43)

This invention relates to agricultural machinery and, more particularly, pertains to an implement for conditioning the soil including a rotary sub-soil plow.

This application is a division of the copending application Serial No. 378,276, filed September 3, 1953, by the same named inventor.

The cultivation or preparation of soil for the growing of crops requires many operations to be performed thereon. For example, it is always necessary to plow and harrow the ground in order to break it up and to divide it into small porous clusters. Furthermore, most soils need to be treated with some natural or synthetic soil conditioner in order to form stable agglomerates or aggregates with the clays and fine silts. This latter operation is done to preserve the loose porous condition created by prior tilling.

In the past each of these operations has generally been performed separately, that is, a plow originally breaks up the ground and turns it over; next, a harrow is drawn over the plowed earth and so on. Finally, after the soil has been mechanically prepared or tilled, another implement carrying the dry or liquid chemical soil conditioner sprays or otherwise spreads the conditioner over the soil.

The above described separately performed series of operations are naturally expensive and time consuming and thus inefficient in accomplishing the end result, namely, properly-conditioned soil. Because of the time lag between operations, much of the effect of a prior performed operation is lost by the time the subsequent operation is performed. For example, the harrow breaks up the soil into a loose porous condition but by the time the chemical soil conditioner is applied, the soil might become crusty again, thereby preventing thorough infiltration by the conditioner.

Also, the application of soil conditioners to the top of the ground never yields a homogeneous treatment throughout the desired layer depth even if the soil retains its porous condition at the time the conditioner is applied.

It is, therefore, a primary object of this invention to provide improvements in rotary sub-soil plows.

It is a further object of this invention to provide a rotary sub-soil plow which may be vertically adjusted for varying soil conditions.

It is still a further object of this invention to provide a rotary sub-soil plow comprising a plurality of augers arranged to form a compact and simplified unit.

It is another object of this invention to provide a rotary sub-soil plow having improved structure for vertically adjusting a plurality of augers.

These and other objects of the invention will become more apparent upon reference to the following description and accompanying drawings, in which:

Figure 1 is a side view of the combination soil conditioning apparatus pulled by a tractor;

Figure 2 is a side view of a modified form of plow which can be used in the embodiment of Figure 1;

Figure 3 is an exploded side sectional view of the plow of Figure 2;

Figure 4 is a sectional view taken along lines 4—4 of Figure 3;

Figure 5 is a sectional view taken along lines 5—5 of Figure 3;

Figure 6 is a sectional view taken along lines 6—6 of Figure 3; and

Figure 7 is a left hand side view of the plow of Figure 3 having a portion cut away.

Referring to Figure 1 in particular, there will be seen a tractor drawn frame 50 supported on wheels 51. A harrow arrangement consisting of a toothed harrow 52 and a two-ganged disc harrow 54 is carried on the front end of the frame. Toothed harrow 52 comprises a plurality of teeth 56 which are interconnected by bar 58 for vertical pivotal movement about their mounting axle 60. Adjustment of the teeth to the desired angle is effected by lever 62 connected to bar 58 and operable from the driver's seat on the tractor.

Dependingly mounted from the frame 50 immediately behind ganged harrow 54 are a pair of scrapers or scooping members 64 which are angularly arranged to gather the dirt or soil into a windrow. A conveyor 66 is mounted on frame 50 behind the scrapers 64 and is provided with a lower scooping portion 68 for gathering the soil arranged in a row by the scrapers 64. A housing 74 integral with scooper 68 encloses the entire conveyor.

It will be noted that belt 70 is mounted for rotation on axles at the top and bottom and that the lower axle 80 has a pulley 82 attached thereto. A gasoline engine 84 is mounted on frame 50 for driving the conveyor by belt 86 extending between pulley 82 and pulley 88 directly connected to the shaft of engine 84.

The upper portion of housing 74 which is directed downwardly extends into the mixing and treating chamber 94 supported on the rear of frame 50. This chamber 94 is mounted for rotation in cradle 96 by means of the ring gears 98 and cooperating driving pinions mounted on rotatable rod 110. Guide roller wheels are provided at spaced intervals on the cradle 96 to respectively restrict longitudinal and vertical vibration of chamber 94. A belt driven pulley arrangement 116 driven from engine 84 provides driving power for shaft 110.

A tapered outlet nozzle 118 is secured near its open end to frame 50, as indicated at 120 and is provided at its upper end with bearing means in the form of an annular band 122 for rotatively slidingly receiving chamber 94.

A hopper 124 is supported on frame 50 over chamber 94 by the trussed structure 126 and has an outlet spout 128 extending into chamber 94 above conveyor housing 74.

Supported on the front side of conveyor housing 74 is a tank 130 having an outlet conduit or line 132 extending into the top of conveyor housing 74, as shown in Figure 1. This tank may contain gas in which event a gas burner jet would be connected to the outlet line 132 within the housing 74 so as to direct the flame downwardly. Alternatively the tank may contain some treating chemical in which case an ordinary spray nozzle would be connected to conduit 132. If desired, a valve is provided in conduit 132 for completely cutting off the supply from tank 130.

In operation, the apparatus of Figure 1 is driven over the soil to be treated. Harrows 52 and 54 cut up the clods and tend to render the soil loose and porous. Scrapers 64 push the relatively loose chunks of soil into a windrow where it is picked up by a conveyor scooper 68. The elevated soil is then dumped into the rotating treating chamber 94 where it is mixed with chemicals either in solid or liquid form fed in from hopper 124. The inside of chamber 94 may be provided with baffles to aid in pulverizing and further intimately mixing the soil particles with the treating chemical.

As previously indicated, tank 130 may supply gas to a burner for heating the soil as it ascends the conveyor. This treatment increases the temperature of the soil to the extent necessary to kill various insects and pests in the soil and also aids in softening the soil prior to final mixing in the chamber 94. Thus, not only are insects killed but better mixing with the soil conditioning chemical is insured. Alternatively a liquid soil conditioning chemical may be supplied from tank 130 and in an obvious manner.

After the soil has gone through the above treating stages it is discharges through spout 118 onto rotating blades 134 for dispersal onto the ground. Blades 134 may be driven in any manner such as from the rear axle or from engine 84.

Figures 2 to 6 illustrate a rotary vertical subsoil plow 150 which may alternatively be used with the embodiment of Figure 1. Although in Figure 2, the plow is shown mounted in a separate frame 152, it may be incorporated onto frame 50 in front of toothed harrow 52 or the frame 152 may be provided with wheels as 153 and a means for connecting the frame to the front of a tractor.

The plow itself, as illustrated in Figure 3, may consist of a plurality of vertically mounted shafts 154 carrying auger blades 156 at their lower ends. As many shafts as appear desirable may be utilized but three have proven satisfactory. Each shaft is of such length that the auger blades are at successively greater depths from the front to the rear. It is to be understood that the shorter shaft is in front and the longer shaft in the rear when actually plowing so that the blades on the shorter shaft will cut into the top soil leaving a path clear for the next blade to break subsoil and so on.

Each shaft 154 is rotatively journalled in a sleeve 158 by roller bearing means 160. The lower portion 162 of shaft 154 within sleeve 158 has a smooth exterior and is held against vertical movement relative to the sleeve by threaded nut 164 engaging interior threads on the upper portion of sleeve 158.

Each of the sleeves 158 are mounted for vertical reciprocation in a housing 168 which has cylindrical bores 170 therein for slidingly receiving the sleeves 158. The upper portion of housing 168 is laterally expanded as best shown in Figures 4, 5 and 6 and comprises a gear box 172. The upper portion 174 of each shaft 154 is splined for non-rotatively but longitudinally slidingly receiving the gears 176. These gears 176 intermesh, as seen in Figure 4, and are driven from worm gear 178, which, in turn, may be connected to the power take-off shaft of the tractor.

The sleeves 158 and thereby the shafts 154 are vertically reciprocally controlled by an air cylinder 180 positioned on top of housing 168. Within cylinder 180 is a slidable piston 182 having a depending rod 184 which is rigidly secured to a horizontal plate 186 within housing 168 and above gear box 172. Vertical grooves 188 are provided in the side of the housing for slidingly receiving the lateral extensions 190 on the plate 186. The upper ends of each shaft 154 are rotatably secured in plate 186 such that upon vertical movement of piston 182 each of the shafts 154 will reciprocate vertically through gears 176, thereby causing the auger blades 156 to reciprocate vertically. Ports 192 and 194 are connected by lines to any suitable supply of air for controlling piston movement.

This rotary plow can, therefore, be adjusted to vary the depth of plowing desired and to insure that subsoil is brought to the surface to be treated in like manner with the top soil. As previously noted, this plow is preferably attached to frame 50 immediately in front of toothed harrow 152 whereby complete treatment of the soil may be had by one combined machine.

From the above it will be evident that an improved rotary sub-soil plow has been disclosed. In addition, apparatus has been provided for taking a strip of soil, initially loosening this soil and immediately lifting this strip or portion of soil into some type of treating chamber where chemicals are mixed and intimately associated with the soil. Not only are means provided to control the depth of layer it is desired to treat, but, furthermore, this layer once selected is homogeneously treated with the conditioner. Since it is the purpose of synthetic or natural soil conditioners to stabilize the loose porous condition of soil created by plowing and harrowing, this invention offers the great advantage of being able to treat plowed or tilled soil immediately after such tilling or plowing. Clearly this is when the soil conditioner will have its greatest effect.

It has long been a problem with soil conditioners to obtain homogeneous treatment of a layer of soil by surface spraying and like methods. This has been particularly true with conditioners in solution form. However, with the present invention, this no longer need be troublesome since each particle of soil in a particular layer is similarly treated whether it be in the mixing chambers disclosed or on the flat surface of an endless belt.

It will be understood that this invention is susceptible to modification according to various usages and conditions and, accordingly, it is desired to comprehend such modifications within the scope of the appended claims.

I claim:

1. A rotary sub-soil plow comprising a housing having a plurality of vertical bores therein, a vertically reciprocable plate mounted in said housing above said vertical bores, a sleeve member slidably mounted in each said bore, a plurality of shafts rotatably journalled in said sleeves and arranged for vertical movement therewith, an auger blade on the lower end of each shaft, the upper end of each shaft rotatably secured in said plate, means to vertically move said plate whereby said shafts are raised and lowered in unison, and means carried by said housing for rotating said shafts.

2. A rotary sub-soil plow comprising a housing having a plurality of vertical bores therein, a vertically reciprocable plate mounted in said housing above said vertical bores, a sleeve member slidably mounted in each said bore, a plurality of shafts rotatably journalled in said sleeves and arranged for vertical movement therewith, an auger blade on the lower end of each shaft, the upper end of each shaft rotatably secured in said plate, a splined portion on each said shaft adjacent the upper end thereof, intermeshing gear means on said splined portions and enclosed in said housing, means for driving said gear means for rotating said shafts, and means to vertically move said plate whereby said shafts are raised and lowered in unison.

3. A rotary sub-soil plow comprising a housing having a plurality of vertical bores therein, a vertically reciprocable plate mounted in said housing above said vertical bores, a sleeve member slidably mounted in each said bore, a plurality of shafts rotatably journalled in said sleeves and arranged for vertical movement therewith, an auger blade on the lower end of each shaft, the upper end of each shaft rotatably secured in said plate, a splined portion on each said shaft adjacent the upper end thereof, intermeshing gear means on said splined portions, means restraining said gear means against vertical movement, means drivingly engaging at least one of said gear means for rotating said shafts, and means to vertically move said plates whereby said shafts are raised and lowered in unison.

4. A rotary sub-soil plow comprising a housing having a plurality of vertical bores therein, a vertically reciprocable plate mounted in said housing above said vertical bores, a sleeve member slidably mounted in each said bore, a plurality of shafts rotatably journalled in said sleeves and arranged for vertical movement therewith, an auger blade on the lower end of each shaft, the upper end of each shaft rotatably secured in said plate, a splined portion on each said shaft adjacent the upper end thereof, intermeshing gear means on said splined portions, means restraining said gear means against vertical movement, means drivingly engaging at least one of said gear means for rotating said shafts, an air cylinder mounted on said housing, and means operatively connected to said plate from said air cylinder for raising and lowering said shafts in unison.

5. A rotary sub-soil plow comprising a housing having a plurality of vertical bores therein, a vertically reciprocable plate mounted in said housing above said vertical bores, a sleeve member slidably mounted in each said bore, a plurality of shafts rotatably journalled in said sleeves and arranged for vertical movement therewith, an auger blade on the lower end of each shaft, the upper end of each shaft rotatably secured in said plate, a splined portion on each said shaft adjacent the upper end thereof, intermeshing gear means on said splined portions, means within said housing restraining said gear means against vertical movement, a drive shaft extending transversely of said plurality of shafts and having worm gear means thereon for drivingly engaging the outer ones of said gear means to rotate said shafts, and means on said housing for vertically moving said plate to raise and lower said shafts in unison.

References Cited in the file of this patent

UNITED STATES PATENTS

| | | |
|---|---|---|
| 160,760 | Fogarty | Mar. 16, 1875 |
| 211,843 | Fogarty | Feb. 4, 1879 |
| 1,295,281 | Denny | Feb. 25, 1919 |
| 1,320,469 | Hicks | Nov. 4, 1919 |
| 1,342,815 | Ingram | June 8, 1920 |
| 1,562,405 | Wolff | Nov. 17, 1925 |
| 1,691,351 | Hicks | Nov. 13, 1928 |
| 2,582,364 | Tice | Jan. 15, 1952 |

FOREIGN PATENTS

| | | |
|---|---|---|
| 701,592 | France | Mar. 18, 1931 |